(12) United States Patent
Onitsuka

(10) Patent No.: US 10,666,832 B2
(45) Date of Patent: May 26, 2020

(54) IMAGE READING APPARATUS, NON-TRANSITORY COMPUTER READABLE MEDIUM, TRANSMITTING APPARATUS AND METHOD FOR STORING NAME AND TRANSMISSION DESTINATION INFORMATION AFTER TRANSMITTING IMAGE DATA

(71) Applicant: FUJI XEROX CO., LTD., Tokyo (JP)

(72) Inventor: Miki Onitsuka, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/440,752

(22) Filed: Feb. 23, 2017

(65) Prior Publication Data
US 2018/0048784 A1 Feb. 15, 2018

(30) Foreign Application Priority Data
Aug. 10, 2016 (JP) ................. 2016-157769

(51) Int. Cl.
*H04N 1/327* (2006.01)
*H04N 1/00* (2006.01)
(Continued)

(52) U.S. Cl.
CPC ..... *H04N 1/32752* (2013.01); *H04N 1/00413* (2013.01); *H04N 1/32767* (2013.01);
(Continued)

(58) Field of Classification Search
None
See application file for complete search history.

(56) References Cited

U.S. PATENT DOCUMENTS 6,903,838 B1* 6/2005 Hanson .............. H04N 1/32128
358/1.15
2004/0048621 A1* 3/2004 Takahashi .......... H04N 1/00307
455/456.3
(Continued)

FOREIGN PATENT DOCUMENTS

CN 104980615 A 10/2015
JP 2000-115340 A 4/2000
(Continued)

OTHER PUBLICATIONS

Machine translation (english) of JP Pub 2014-081930 to Ogawa et al.*
(Continued)

*Primary Examiner* — Benny Q Tieu
*Assistant Examiner* — Haris Sabah
(74) *Attorney, Agent, or Firm* — Oliff PLC

(57) ABSTRACT

A transmitting apparatus includes a memory, a first receiving unit, a second receiving unit, an instruction unit, and a transmitting unit. The memory stores a name and a transmission destination in association with each other. The first receiving unit receives specification of a transmission destination of data. The second receiving unit receives, in a case where the transmission destination indicated by the specification received by the first receiving unit is not stored in the memory, specification of a name which is associated with the transmission destination. The instruction unit instructs, in a case where the second receiving unit receives the specification of the name, the memory to store the name and the transmission destination indicated by the specification received by the first receiving unit in association with each other. The transmitting unit transmits image data to the transmission destination indicated by the specification received by the first receiving unit.

8 Claims, 7 Drawing Sheets

(51) Int. Cl.
 *H04N 1/32* (2006.01)
 *G03G 15/00* (2006.01)
(52) U.S. Cl.
 CPC ..... *G03G 15/5091* (2013.01); *H04N 1/32438* (2013.01); *H04N 1/32662* (2013.01); *H04N 2201/0081* (2013.01)

(56) References Cited

U.S. PATENT DOCUMENTS

| | | | | |
|---|---|---|---|---|
| 2014/0376044 | A1* | 12/2014 | Utsumi | H04N 1/00106 358/1.15 |
| 2015/0296097 | A1* | 10/2015 | Kawashima | H04N 1/32539 358/474 |
| 2016/0269573 | A1* | 9/2016 | Sugita | G06F 3/1292 |

FOREIGN PATENT DOCUMENTS

| | | |
|---|---|---|
| JP | 2002-24140 A | 1/2002 |
| JP | 3751580 B2 | 3/2006 |
| JP | 2007-166156 A | 6/2007 |
| JP | 2010-102379 A | 5/2010 |
| JP | 2014-081930 A | 5/2014 |

OTHER PUBLICATIONS

Mar. 24, 2020 Office Action issued in Japanese Patent Application No. 2016-157769.
Mar. 20, 2020 Office Action issued in Chinese Patent Application No. 201710219428.9.

* cited by examiner

US 10,666,832 B2

IMAGE READING APPARATUS, NON-TRANSITORY COMPUTER READABLE MEDIUM, TRANSMITTING APPARATUS AND METHOD FOR STORING NAME AND TRANSMISSION DESTINATION INFORMATION AFTER TRANSMITTING IMAGE DATA

CROSS-REFERENCE TO RELATED APPLICATIONS

This application is based on and claims priority under 35 USC 119 from Japanese Patent Application No. 2016-157769 filed Aug. 10, 2016.

BACKGROUND

The present invention relates to a transmitting apparatus, an image reading apparatus, a transmitting method, and a non-transitory computer readable medium.

SUMMARY

According to an aspect of the invention, there is provided a transmitting apparatus including a memory, a first receiving unit, a second receiving unit, an instruction unit, and a transmitting unit. The memory stores a name and a transmission destination in association with each other. The first receiving unit receives specification of a transmission destination of data. The second receiving unit receives, in a case where the transmission destination indicated by the specification received by the first receiving unit is not stored in the memory, specification of a name which is associated with the transmission destination. The instruction unit instructs, in a case where the second receiving unit receives the specification of the name, the memory to store the name and the transmission destination indicated by the specification received by the first receiving unit in association with each other. The transmitting unit transmits image data to the transmission destination indicated by the specification received by the first receiving unit.

BRIEF DESCRIPTION OF THE DRAWINGS

Exemplary embodiments of the present invention will be described in detail based on the following figures, wherein.

DETAILED DESCRIPTION

1. Exemplary Embodiments 1-1. Entire Configuration of Image Processing System

Figure 1:
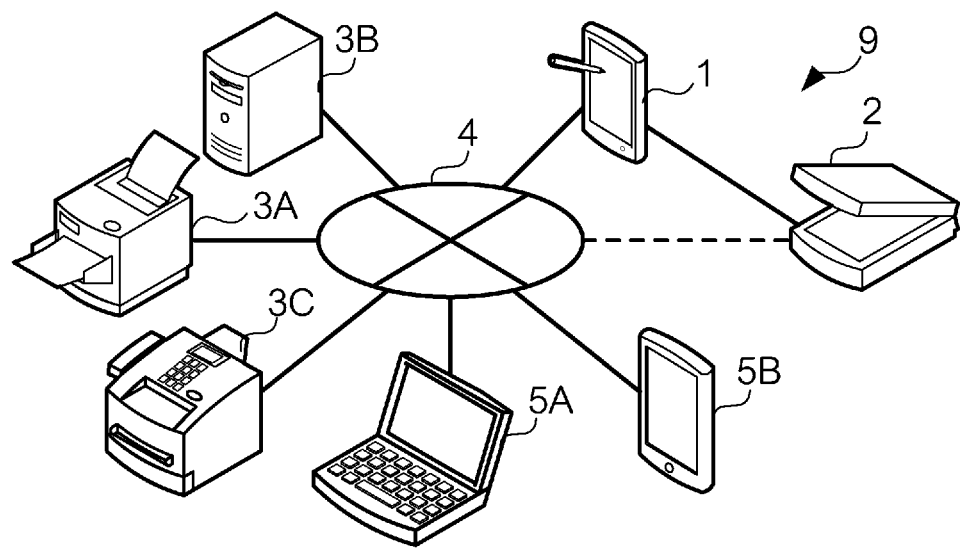
FIG. 1 is a diagram illustrating the entire configuration of an image processing system according to an exemplary embodiment.

FIG. 1 is a diagram illustrating the entire configuration of an image processing system 9 according to an exemplary embodiment. The image processing system 9 includes a communication line 4 which configures, for example, a local area network (LAN), an operation panel 1 which is connected to the communication line 4, and multiple image processing apparatuses 3. The image processing system 9 further includes an image reading apparatus 2 which is connected to the operation panel 1 and controlled by the operation panel 1. The image reading apparatus 2 may be connected to the communication line 4 as long as the image reading apparatus 2 is controlled by the operation panel 1. The image processing system 9 may further include one or more terminals 5. The communication line 4 may include a wide area network (WAN), a public telephone line, and the like.

The operation panel 1 illustrated in FIG. 1 is a controller which receives an operation by a user, transmits a control signal corresponding to the operation to the image reading apparatus 2, and causing the image reading apparatus 2 to read an image. Furthermore, the operation panel 1 is a transmitting apparatus which acquires image data, which is generated by the image reading apparatus 2 based on an image read by the image reading apparatus 2, and transmits the image data to an image processing apparatus 3 as a transmission destination specified by an operation by the user. The transmission destination is stored by the operation panel 1.

The image reading apparatus 2 illustrated in FIG. 1 is an apparatus which reads an image formed on a medium or the like in accordance with an instruction received from the operation panel 1 and generates image data representing the image. The image processing system 9 may include one image reading apparatus 2, as illustrated in FIG. 1, or may include multiple image reading apparatuses 2.

The image processing apparatus 3 illustrated in FIG. 1 is an information processing apparatus which is configured to be connected to the image reading apparatus 2 via the communication line 4 and the operation panel 1. The image processing system 9 may include multiple image processing apparatuses 3 or one image processing apparatus 3. The image processing apparatuses 3 illustrated in FIG. 1 represent image processing apparatuses 3A, 3B, and 3C. The image processing apparatuses 3 are connected to the operation panel 1 via the communication line 4, receive image data representing an image read by the image reading apparatus 2 via the operation panel 1, and perform specified processing on the image data.

For example, the image processing apparatus 3A is an image forming apparatus which forms an image, based on image data received from the operation panel 1, on a medium such as paper by an electrophotographic system, a thermal transfer system, an inkjet system, or the like. Furthermore, for example, the image processing apparatus 3B is a server apparatus which stores image data received from the operation panel 1 and supplies the image data in accordance with a request from the terminal 5. Furthermore, the image processing apparatus 3C is, for example, a facsimile which is connected to a public telephone line, which is not illustrated in FIG. 1, and transmits image data received from the operation panel 1 to a different apparatus. Furthermore, the image processing apparatus 3 may be a mail server apparatus which delivers electronic mail to which image data received from the operation panel 1 is attached to a specified transmission destination.

The terminals 5 illustrated in FIG. 1 are information processing terminals which acquire image data received by the image processing apparatuses 3. The terminals 5 illustrated in FIG. 1 are, for example, a terminal 5A, which is a notebook personal computer, a terminal 5B, which is a cellular phone, and the like.

1-2. Configuration of Image Reading Apparatus

Figure 2:
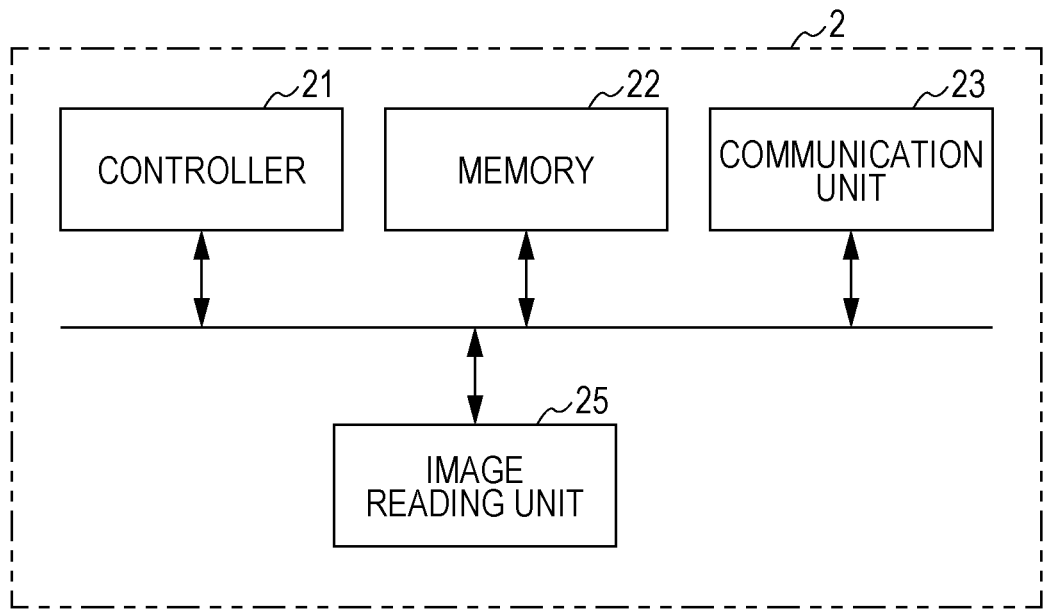
FIG. 2 is a diagram illustrating a configuration of an image reading apparatus.

FIG. 2 is a diagram illustrating a configuration of the image reading apparatus 2. The image reading apparatus 2 includes a controller 21, a memory 22, a communication unit 23, and an image reading unit 25. The controller 21 includes a central processing unit (CPU), a read only memory (ROM), and a random access memory (RAM), and controls each unit of the image reading apparatus 2 by causing the CPU to read and execute a computer program (hereinafter, simply referred to as a program) stored in the ROM or the memory 22.

The communication unit 23 is a communication circuit which is connected to the operation panel 1 in a wired or wireless manner. Furthermore, the communication unit 23 may include a function to be connected to the communication line 4. The communication unit 23 may not be directly connected to the operation panel 1 in the case where the communication unit 23 is connected to the operation panel 1 via the communication line 4.

The image reading unit 25 optically reads an image formed on a medium such as paper and generates image data representing the image, under the control of the controller 21.

The memory 22 is a large-capacity memory such as a hard disk drive, and stores various programs to be read by the CPU of the controller 21. Furthermore, the memory 22 may store image data representing an image read by the image reading unit 25.

1-3. Configuration of Operation Panel

Figure 3:
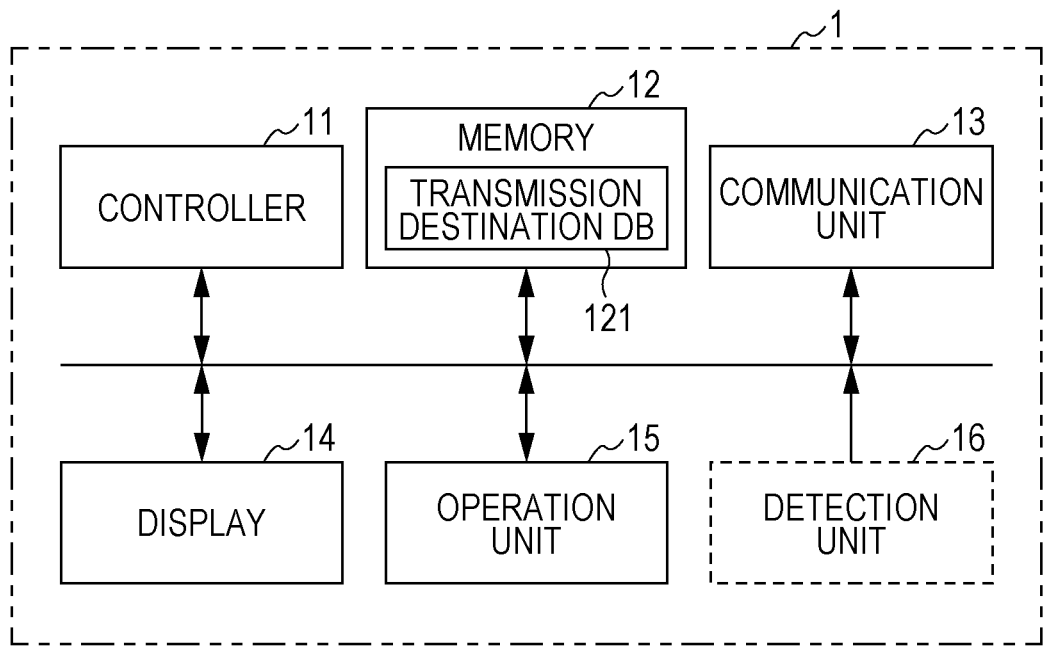
FIG. 3 is a diagram illustrating a configuration of an operation panel.

FIG. 3 is a diagram illustrating a configuration of the operation panel 1. The operation panel 1 is an example of a controller which is connected to the image reading apparatus 2 directly or via the communication line 4 and controls the image reading apparatus 2. The operation panel 1 includes a controller 11, a memory 12, a communication unit 13, a display 14, and an operation unit 15. Furthermore, the operation panel 1 may include a detection unit 16 which detects whether or not a user is present within a predetermined range.

The controller 11 includes a CPU, a ROM, and a RAM, and controls each unit of the operation panel 1 by causing the CPU to read and execute a program stored in the ROM or the memory 12.

The communication unit 13 is a communication circuit which is connected to the image reading apparatus 2 in a wired or wireless manner. Furthermore, the communication unit 13 is connected to the communication line 4 in a wired or wireless manner. The communication unit 13 may be connected to the image reading apparatus 2 via the communication line 4.

The memory 12 is a large-capacity memory such as a solid-state drive, and stores various programs to be read by the CPU of the controller 11. Furthermore, the memory 12 stores a transmission destination database (hereinafter, referred to as a DB) 121, which is a DB for managing transmission destinations of image data.

The transmission destination DB 121 is a so-called address book, and is a database in which multiple pairs, each of the pairs including a character string representing a transmission destination of image data and a procedure to be used for transmitting the image data to the transmission destination, are described for each user name, which is identification information identifying a user who uses the image reading apparatus 2.

Figure 4:
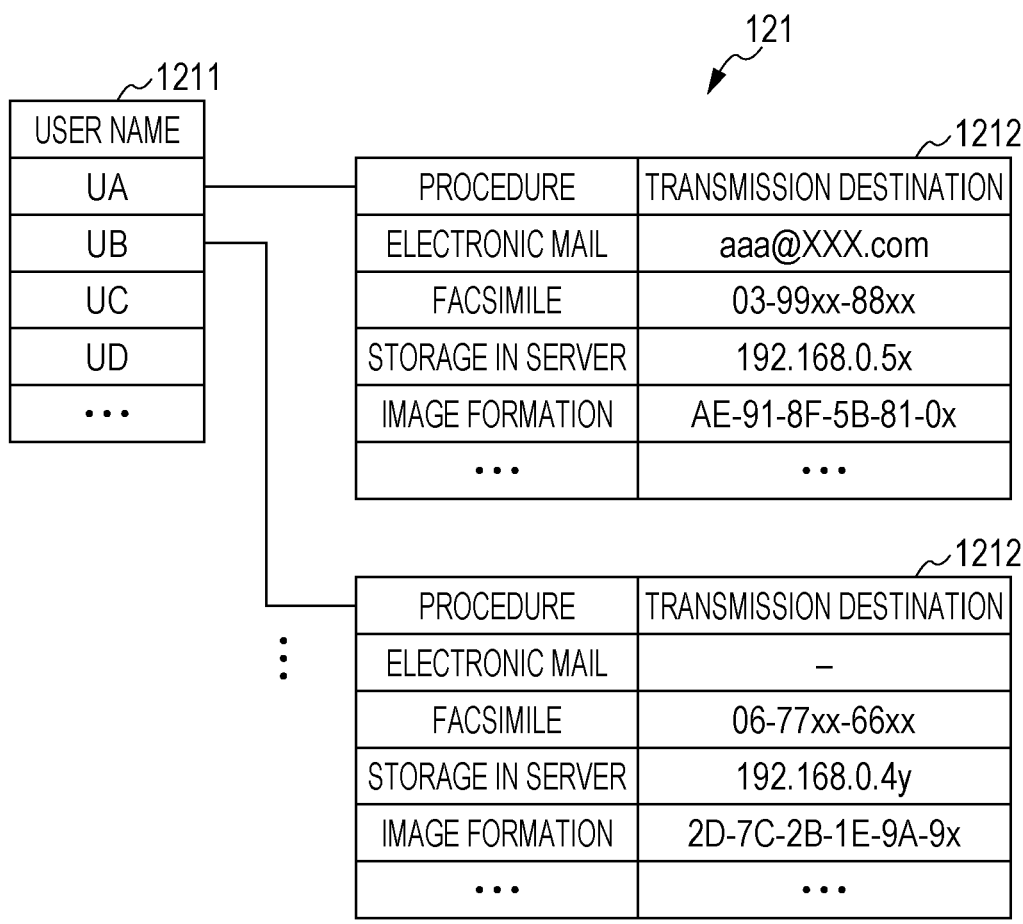
FIG. 4 is a diagram illustrating an example of a transmission destination DB.

FIG. 4 is a diagram illustrating an example of the transmission destination DB 121. The transmission destination DB 121 includes a user name list 1211 and a transmission destination list 1212. In the user name list 1211, user names, which are identification information of multiple users, are listed. In the transmission destination DB 121, character strings each representing a transmission destination of image data and names of procedures to be used for transmitting the image data to the transmission destinations are described in association with each other.

That is, the transmission destination DB 121 of the memory 12 stores a transmission destination and a procedure to be used for transmitting image data to the transmission destination in association with each other. The controller 11 transmits the image data in accordance with the procedure which is associated with a transmission destination in the transmission destination DB 121 of the memory 12.

For example, in the transmission destination DB 121 illustrated in FIG. 4, for a user with a user name of "UA", "aaa@XXX.com" is described as a transmission destination for transmission with a procedure of "electronic mail". Furthermore, in the transmission destination DB 121 illustrated in FIG. 4, for a user with a user name of "UB", "–" representing non-registration is described as a transmission destination for transmission with a procedure of "electronic mail".

1-4. Functional Configuration of Operation Panel

Figure 5:
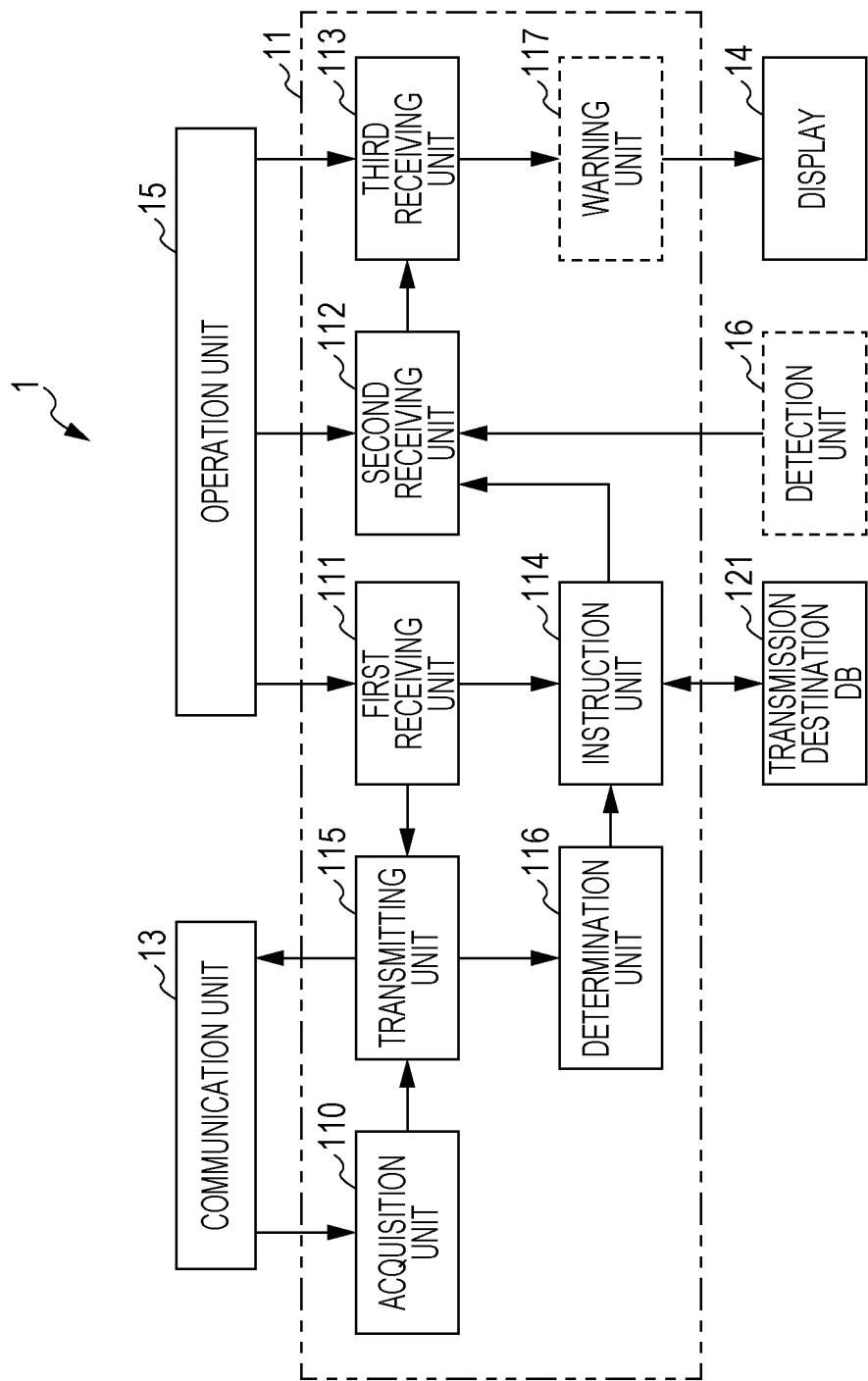
FIG. 5 is a diagram illustrating a functional configuration of the operation panel.

FIG. 5 is a diagram illustrating a functional configuration of the operation panel 1. The operation panel 1 functions as an acquisition unit 110, a first receiving unit 111, a second receiving unit 112, an instruction unit 114, and a transmitting unit 115 illustrated in FIG. 5 when the controller 11 executes a program stored in the memory 12. Furthermore, the controller 11 may function as a third receiving unit 113, a determination unit 116, and a warning unit 117 illustrated by broken lines in FIG. 5 when the controller 11 executes a program.

The acquisition unit 110 acquires, via the communication unit 13, image data representing an image read by the image reading apparatus 2.

The first receiving unit 111 receives specification of a transmission destination of the image data from the operation unit 15. In the case where a transmission destination indicated by the specification received by the first receiving unit 111 is not stored in the transmission destination DB 121 of the memory 12, the instruction unit 114 instructs the second receiving unit 112 to receive specification of a name associated with the transmission destination. That is, in the case where a transmission destination indicated by specification received by the first receiving unit 111 is not stored in the transmission destination DB 121 of the memory 12, the second receiving unit 112 receives specification of a name which is associated with the transmission destination.

Furthermore, in the case where the second receiving unit 112 receives specification of a name, the instruction unit 114 instructs the memory 12 to store the name and the transmission destination indicated by the specification received by the first receiving unit 111 in association with each other.

The transmitting unit 115 transmits image data that the acquisition unit 110 acquires from the image reading apparatus 2 to the transmission destination indicated by the specification received by the first receiving unit 111.

The determination unit 116 determines whether or not transmission of image data by the transmitting unit 115 is successful. When the determination unit 116 determines that transmission of image data is successful, the instruction unit 114 instructs the second receiving unit 112 to receive specification of a name which is associated with the transmission destination. That is, when the determination unit 116 determines that transmission of image data is successful, the second receiving unit 112 receives specification of a name which is associated with the transmission destination.

The third receiving unit 113 receives an instruction indicating ending of an operation from the operation unit 15. The "instruction indicating ending of an operation" is an instruction indicating that a user has finished an operation using the operation panel 1, for example, an instruction for canceling authentication to the operation panel 1.

In the case where the third receiving unit 113 receives an instruction indicating ending before specification of a name is received by the second receiving unit 112, the warning unit 117 provides a warning. This warning is provided, for example, by causing the display 14 to display an image indicating that "a name is not specified".

In the case where the operation panel 1 includes the detection unit 16 which detects a user, the second receiving unit 112 may vary its operation according to a detection result of the detection unit 16. For example, in the case where the detection unit 16 detects that a user has moved out of a predetermined range, the second receiving unit 112 may stop receiving specification of a name.

1-5. Operation of Operation Panel

Figure 6:
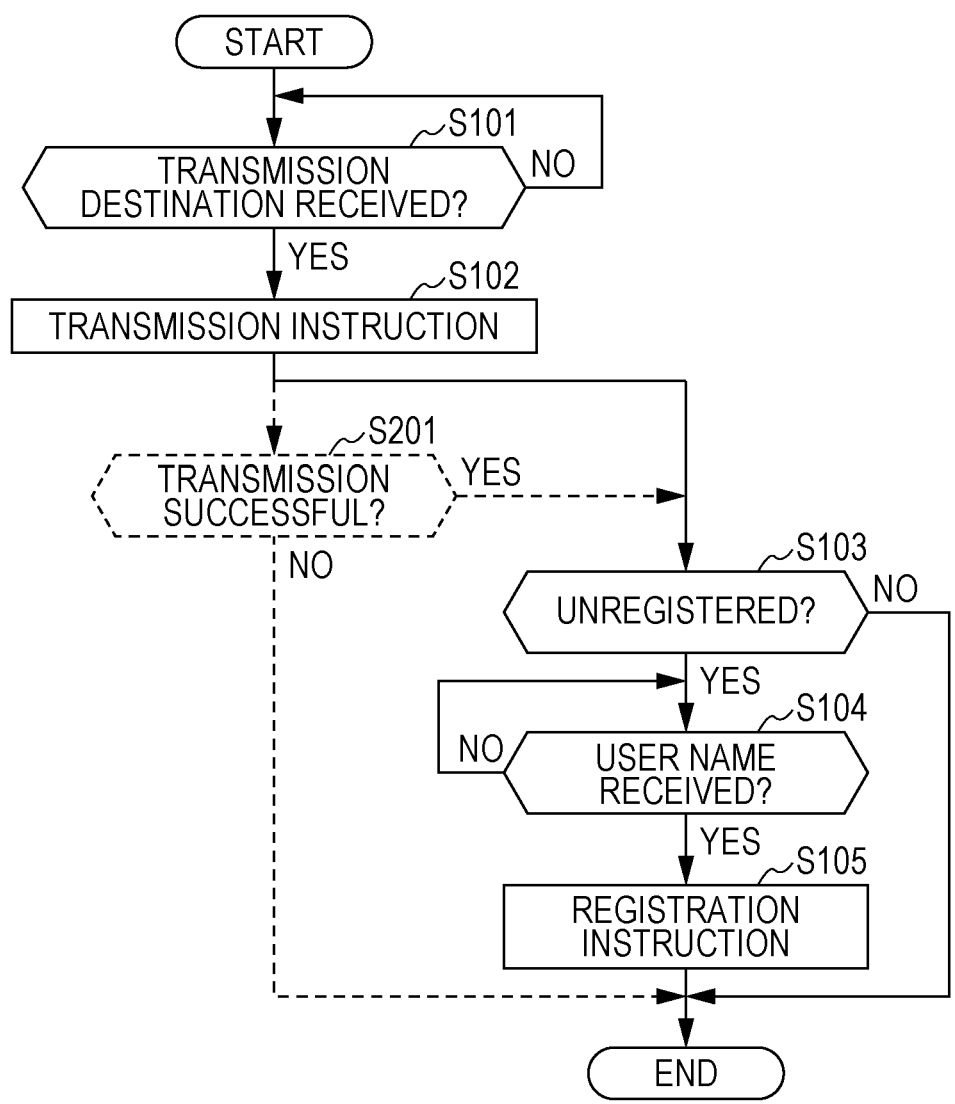
FIG. 6 is a flowchart explaining the flow of an operation of the operation panel.

FIG. 6 is a flowchart explaining the flow of an operation of the operation panel 1. The controller 11 of the operation panel 1 determines whether or not specification of a transmission destination by a user is received from the operation unit 15 (step S101). This determination processing continues as long as the controller 11 of the operation panel 1 determines that specification of a transmission destination is not received (step S101; NO).

Figure 7:
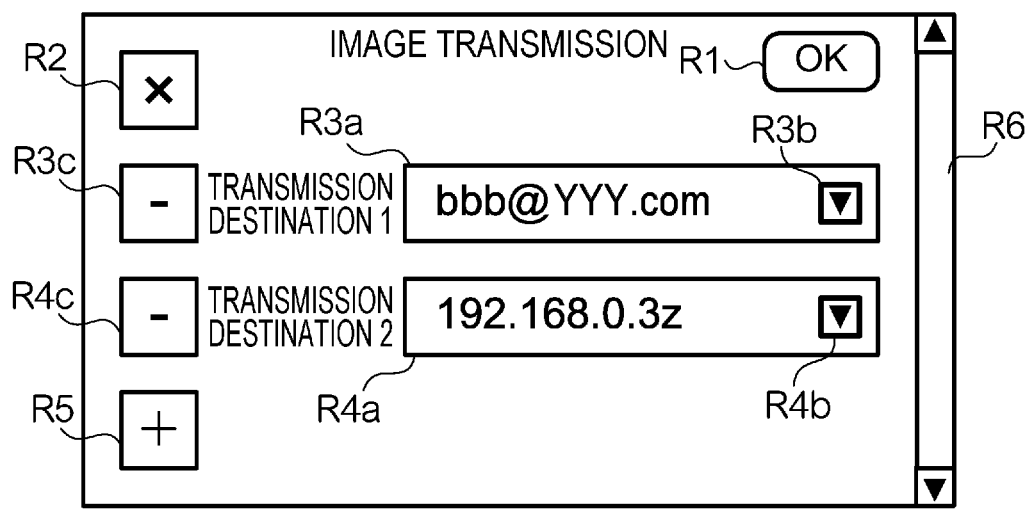
FIG. 7 is a diagram illustrating an example of an operation screen which receives specification of a transmission destination.

FIG. 7 is a diagram illustrating an example of an operation screen for receiving specification of a transmission destination. The controller 11 of the operation panel 1 causes the display 14 to display an operation screen illustrated in FIG. 7. The operation screen has a title of "image transmission". In a region R1 on the right of the title, an "OK" button is indicated. The button in the region R1 is a button for issuing an instruction to execute transmission of image data. When the button is pressed, the controller 11 determines that specification of a transmission destination is received.

In a region R2 on the left of the title, a "x" button is indicated. The button in the region R2 is a button for issuing an instruction to cancel transmission of image data. When the button is pressed, the controller 11 stops transmission of image data.

A region R3a and a region R4a are boxes for so-called manual inputting. When a user edits a character string representing a transmission destination by operating a keyboard, a numeric keypad, or the like, which is not illustrated in figures, the edited character string is indicated in the regions.

A region R3b is an icon indicated at the right end of the region R3a. A region R4b is an icon indicated at the right end of the region R4a. The icons of the region R3b and the region R4b are represented by, for example, inverted triangles. When a user touches the icon, a so-called pull-down menu is indicated. In the pull-down menu, a list of transmission destinations which have already been stored in the transmission destination DB 121 is indicated. When the user performs an operation for selecting one of the transmission destinations, the transmission destination is selected. That is, the operation panel 1 may provide to a user "selection inputting" which is inputting a transmission destination using the transmission destination DB 121, as well as the above-described manual inputting.

A region R3c is an icon indicated at the left end of the region R3a. A region R4c is an icon indicated at the left end of the region R4a. The icons in the region R3c and the region R4c are represented by, for example, a "– (minus)" character string. When a user touches the icon, the corresponding region R3a or region R4a is deleted.

A region R5 is an icon represented by a "+ (plus)" character string. When a user touches the icon, a box for receiving specification of a transmission destination is added. In a region R6, a scroll bar for adjusting the indication position of the operation screen by scrolling in the case where the longitudinal length of the operation screen exceeds the display region due to addition of the box, is indicated.

As illustrated in FIG. 6, when it is determined that specification of a transmission destination is received (step S101; YES), the controller 11 instructs the communication unit 13 to transmit image data acquired from the image reading apparatus 2 to the specified transmission destination (step S102).

After instructing the communication unit 13 to transmit image data in step S102, the controller 11 may determine whether or not transmission is successful (step S201). When it is determined that transmission is successful (step S201; YES), the controller 11 may proceed to step S103. When it is determined that transmission is not successful (step S201; NO), the controller 11 may end the process. After issuing an instruction to transmit image data in step S102, the controller 11 may directly proceed to step S103.

The controller 11 determines whether or not the specified transmission destination is a transmission destination which is not registered in the transmission destination DB 121 (step S103). When it is determined that the transmission destination is not a transmission destination which is not registered in the transmission destination DB 121 (step S103; NO), the controller 11 ends the process. A case where a user performs selection inputting as described above represents that the specified transmission destination is selected from the transmission destination DB 121. Therefore, in this case, the controller 11 determines that the transmission destination is not a transmission destination which is not registered in the transmission destination DB 121.

When it is determined that the transmission destination is not registered in the transmission destination DB 121 (step S103; YES), the controller 11 determines whether or not a name indicating a user of the transmission destination, that is, specification of a user name, is received from a user via the operation unit 15 (step S104).

Figure 8:
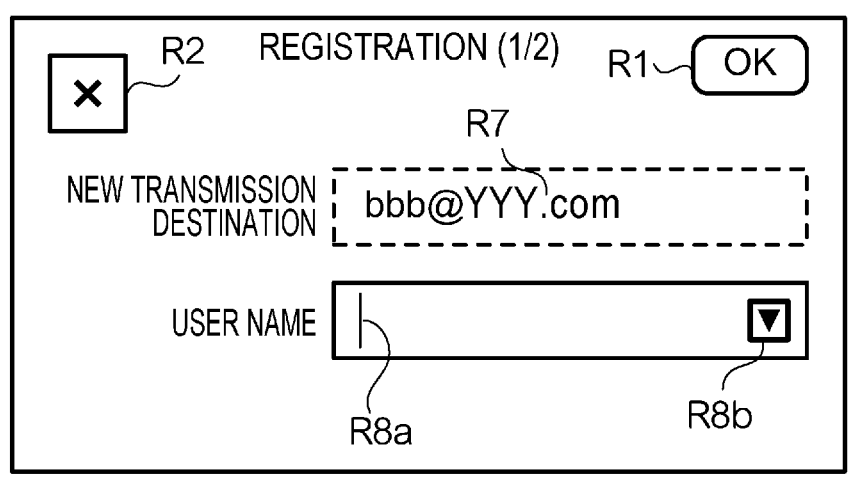
FIG. 8 illustrates an example of an operation screen which receives a user name associated with a specified transmission destination.

FIG. 8 illustrates an example of an operation screen for receiving a user name which is associated with a specified transmission destination. For example, when the button in the region R1 on the operation screen illustrated in FIG. 7 is pressed, the controller 11 of the operation panel 1 determines whether or not character strings representing transmission destinations described in the region R3a and the region R4a are registered in the transmission destination DB 121. In the case where there is a transmission destination which is not registered in the transmission destination DB 121, the controller 11 causes the operation screen illustrated in FIG. 8 to be displayed on the display 14.

The title of the operation screen is "registration (½)". In this title, characters in a bracket represent, for example, the total number of non-registered transmission destinations and the number of the transmission destination that is currently being registered. In the region R1 on the right of the title, an "OK" button is indicated. The button in the region R1 is a button for issuing an instruction to register a non-registered transmission destination. When the button is pressed, the controller 11 determines that an instruction for registering a transmission destination is issued.

In the region R2 on the left of the title, a "x" button is indicated. The button in the region R2 is a button for issuing an instruction to cancel registration of a transmission destination. When the button is pressed, the controller 11 stops registration of a transmission destination.

In a region R7, a character string representing a transmission destination to be registered is indicated. The controller 11 identifies a procedure to be used for transmitting image data to a transmission destination represented by the character string indicated in the region R7. For example, in the region R7 illustrated in FIG. 8, "bbb@YYY.com" is described. The controller 11 extracts, for example, characteristic character strings such as "@" and ".com", determines that the transmission destination is an electronic mail address, and identifies that a procedure to be used for transmission to the transmission destination is "electronic mail".

A region R8a is a box for inputting a name which is associated with the transmission destination indicated in the region R7. When a user operates a keyboard, a numeric keypad, or the like, which is not illustrated in figures, to edit a character string representing a name, the edited character string is indicated in the region R8a.

A region R8b is an icon indicated at the right end of the region R8a, and is represented by, for example, an inverted triangle. When a user touches the icon, a so-called pull-down menu is indicated. In the pull-down menu, a list of user names which are not associated with transmission destinations for the procedure identified based on the character string in the region R7, among user names stored in the user name list 1211 of the transmission destination DB 121. When a user performs an operation for selecting one of the user names, a user name is selected.

As illustrated in FIG. 6, the controller 11 continues the processing of step S104 as long as it is determined that no user name is received (step S104; NO). When it is determined that a user name is received (step S104; YES), the controller 11 instructs the memory 12 to register the received user name and the transmission destination in association with each other in the transmission destination DB 121 (step S105). Then, the process ends.

As described above, the controller 11 of the operation panel 1 receives specification of a transmission destination of image data. For transmission of the image data, it is determined whether or not the specified transmission destination is a transmission destination which is not registered. When it is determined that the specified transmission destination is not registered, the controller 11 requires a user to specify a name which is associated with the transmission destination, and prompts the user to register.

Figure 9:
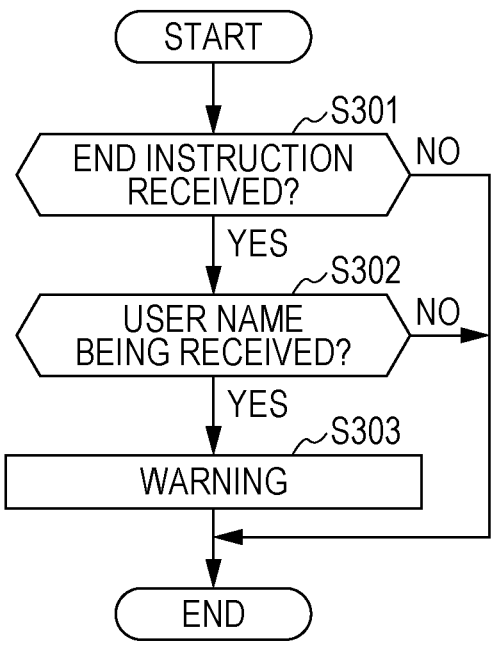
FIG. 9 is a flowchart explaining the flow of an operation of the operation panel when an instruction indicating ending of an operation is received.

Concurrently with the process illustrated in FIG. 6, the controller 11 may receive from the operation unit 15 an instruction indicating ending of an operation. FIG. 9 is a flowchart explaining the flow of an operation of the operation panel 1 when an instruction indicating ending of an operation is received. The controller 11 determines whether or not the operation unit 15 has received an instruction indicating ending of an operation (step S301). When it is determined that an instruction indicating ending of an operation has not been received (step S301; NO), the controller 11 ends the process.

When it is determined that an instruction indicating ending of an operation has been received (step S301; YES), the controller 11 determines whether or not the processing of step S104 illustrated in FIG. 6 for receiving a user name is being performed (step S302). When it is determined that the processing for receiving a user name is not being performed (step S302; NO), the controller 11 ends the process.

When it is determined that the processing for receiving a user name is being performed (step S302; YES), the controller 11 provides a warning to the user by displaying an image indicating that "name is unspecified" on the display 14 (step S303). Accordingly, the user who has issued the instruction indicating ending of an operation is notified by the operation panel 1 as to whether or not there is an unregistered transmission destination.

Figure 10:
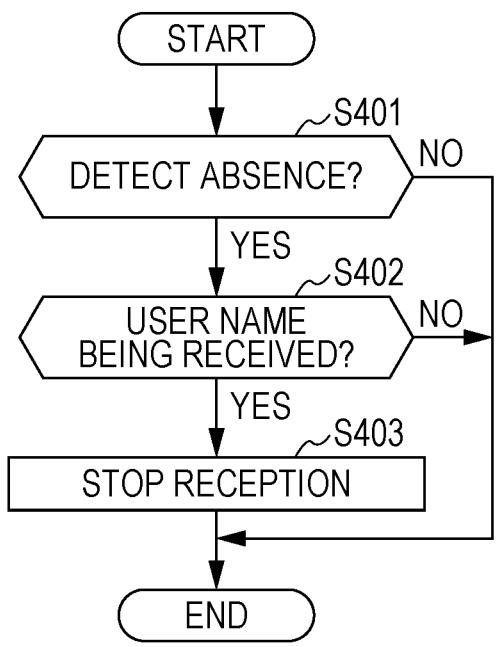
FIG. 10 is a flowchart explaining the flow of an operation of the operation panel when a user has moved out of a predetermined range.

Furthermore, concurrently with the process illustrated in FIG. 6, the controller 11 may change an operation according to a detection result of the detection unit 16. FIG. 10 is a flowchart explaining the flow of an operation of the operation panel 1 when a user has moved out of a predetermined range.

The controller 11 of the operation panel 1 determines, based on a detection result of the detection unit 16, whether or not a user has moved out of a predetermined range of the operation panel 1 (step S401). When it is determined that a user has not moved out of the predetermined range (step S401; NO), the controller 11 ends the process.

When it is determined that a user has moved out of the predetermined range (step S401; YES), the controller 11 determines whether or not the processing of step S104 illustrated in FIG. 6 for receiving a user name is being performed (step S402). When it is determined that the processing for receiving a user name is not being performed (step S402; NO), the controller 11 ends the process.

When it is determined that the processing for receiving a user name is being performed (step S402; YES), the controller 11 stops the processing for receiving a user name (step S403). Accordingly, when no user is in front of the operation panel 1, reception of a user name is stopped.

2. Modifications

Exemplary embodiments of the present invention have been described above. The foregoing exemplary embodiments may be modified as described below. Modifications described below may be combined together.

2-1. Modification 1

In the foregoing exemplary embodiments, the transmission destination DB 121 stores a transmission destination and a procedure to be used for transmitting image data to the transmission destination in association with each other. However, the transmission destination and the procedure may not be stored in association with each other. In this case, for example, a user may specify a procedure at the time of transmission.

2-2. Modification 2

In the foregoing exemplary embodiments, the second receiving unit 112 receives specification of a name which is associated with a non-registered transmission destination in the case where it is determined that transmission is successful. However, specification of a name may be received, irrespective of whether or not transmission is successful, without determining whether or not transmission is successful.

2-3. Modification 3

In the foregoing exemplary embodiments, the operation panel 1 receives an instruction indicating ending of an operation. However, the operation panel 1 may not receive the instruction indicating ending of an operation. For example, when a predetermined time has passed since the last operation, the operation panel 1 may determine that a user has ended the operation.

2-4. Modification 4

The operation panel 1 may not include the detection unit 16 for detecting a user. Furthermore, even if the detection unit 16 detects absence of a user, the operation panel 1 may receive specification of a user name which is associated with a non-registered transmission destination.

2-5. Modification 5

In the foregoing exemplary embodiments, the operation panel 1 and the image reading apparatus 2 are separated from each other. However, the image reading apparatus 2 may include the function of the operation panel 1. In this case, the controller 21 and the memory 22 of the image reading apparatus 2 may function as a controller for controlling the image reading apparatus 2.

2-6. Modification 6

A program to be executed by the controller 11 of the operation panel 1 may be stored in a recording medium readable by a computer device, such as a magnetic recording medium such as a magnetic tape or a magnetic disk, an optical recording medium such as an optical disc, an optical magnetic recording medium, or a semiconductor memory and provided. Furthermore, the program may be downloaded via a communication line such as the Internet. As a controller illustrated as the controller 11, various devices other than a CPU may be used. For example, a dedicated processor or the like may be used as the controller.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A transmitting apparatus comprising:
   a memory which stores a name and a transmission destination in association with each other;
   an input device; and
   a processor programmed to:
   receive a respective transmission destination for data, the respective transmission destination being input by a user using the input device;
   receive, when the respective transmission destination is not stored in the memory, receive a respective name which is associated with the respective transmission destination, the respective name being input by the user using the input device;
   in response to receiving the respective name, instruct the memory to store the respective name and the respective transmission destination in association with each other;
   transmit the data to the respective transmission destination;
   after transmitting the data to the respective transmission destination, receive an instruction to cancel authentication of the user from the user using the input device;
   when the instruction to cancel the authentication is received before the respective name is received, provide a warning to the user without cancelling the authentication; and
   when the instruction to cancel the authentication is received after the respective name is received, cancel the authentication without providing the warning.

2. The transmitting apparatus according to claim 1, wherein:
   the memory stores the respective transmission destination and a procedure to be used for transmitting the data to the respective transmission destination in association with each other; and
   the processor is programmed to transmit the data in accordance with the procedure which is stored in association with the respective transmission destination in the memory.

3. The transmitting apparatus according to claim 1, wherein the processor is programmed to:
   determine whether or not the transmission of the data is successful;
   when the transmission is determined to be successful, and when the instruction to cancel the authentication is received before the respective name is received, provide the warning without cancelling the authentication; and
   when the transmission is determined to be not successful, and when the instruction to cancel the authentication is received before the respective name is received, cancel the authentication without providing the warning.

4. The transmitting apparatus according to claim 1, further comprising: a detection unit which detects the user, wherein when the detection unit detects that the user has moved out of a predetermined range, the respective name is not received.

5. An image reading apparatus comprising:
   the transmitting apparatus according to claim 1; and
   an image reading unit which reads an image, wherein the transmitting apparatus transmits the data, which is image data representing the image read by the image reading unit to the respective transmission destination indicated by the received respective name.

6. The transmitting apparatus according to claim 1, wherein the processor is programmed to:
   receive a plurality of respective transmission destinations for the data, the plurality of respective transmission destinations being input by the user;
   after transmitting the data to the plurality of respective transmission destinations;
   check whether each of the plurality of respective transmission destinations is stored in the memory;
   display one or more of the plurality of respective transmission destinations that are not stored in the memory for registration;

prompt the user to input one or more respective names corresponding to the one or more of the plurality of respective transmission destinations; and store, in the memory, the inputted one or more respective names and the one or more of the plurality of respective transmission destinations in association with each other;

receive the instruction to cancel the authentication from the user;

when the instruction to cancel the authentication is received before the one or more respective names are received, provide the warning to the user without cancelling the authentication; and when the instruction to cancel the authentication is received after the one or more respective names are received, cancel the authentication without providing the warning.

7. A transmitting method performed by a processor programmed to execute the method, the method comprising:

storing, by the processor, a name and a transmission destination in association with each other;

receiving a respective transmission destination for data, the respective transmission destination being input by a user using an input device;

when the respective transmission destination is not stored, receiving a respective name which is associated with the respective transmission destination, the respective name being input by the user using the input device;

in response to receiving the respective name, instructing to store the respective name and the respective transmission destination in association with each other;

transmitting the data to the respective transmission destination;

after transmitting the data to the respective transmission destination, receiving an instruction to cancel authentication of the user from the user using the input device;

when the instruction to cancel the authentication is received before the respective name is received, providing a warning to the user without cancelling the authentication; and when the instruction to cancel the authentication is received after the respective name is received, cancelling the authentication without providing the warning.

8. A non-transitory computer readable medium storing a program causing a computer to execute a process for transmission, the process comprising:

storing a name and a transmission destination in association with each other;

receiving a respective transmission destination for data, the respective transmission destination being input by a user using an input device;

when the respective transmission destination is not stored, receiving a respective name which is associated with the respective transmission destination, the respective name being input by the user using the input device;

in response to receiving the respective name, instructing to store the respective name and the respective transmission destination in association with each other;

transmitting the data to the respective transmission destination;

after transmitting the data to the respective transmission destination, receiving an instruction to cancel authentication of the user from the user using the input device;

when the instruction to cancel the authentication is received before the respective name is received, providing a warning to the user without cancelling the authentication; and when the instruction to cancel the authentication is received after the respective name is received, cancelling the authentication without providing the warning.

* * * * *